Feb. 18, 1930.  J. G. PARARRA  1,747,595
AUTOMATIC BRAKE FOR BABY CARRIAGES
Filed March 2, 1929
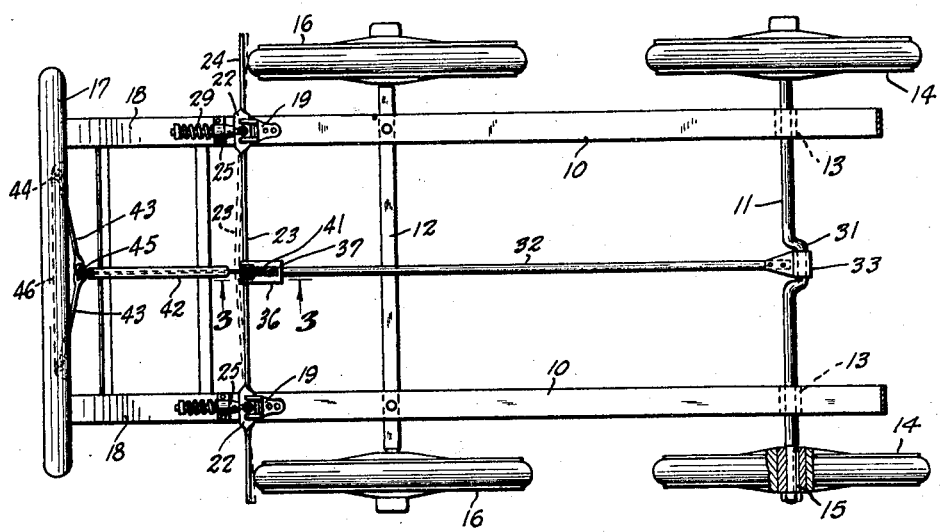
Fig. 1.
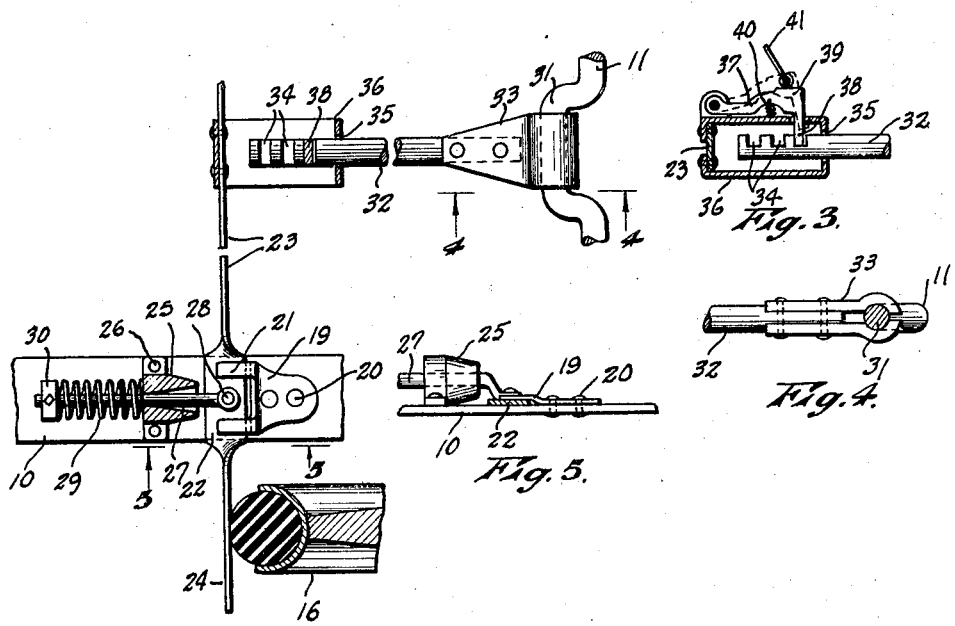
Inventor
Julius G. Pararra
By Wooster Davis
Attorneys

Patented Feb. 18, 1930

1,747,595

UNITED STATES PATENT OFFICE

JULIUS G. PARARRA, OF BRIDGEPORT, CONNECTICUT

AUTOMATIC BRAKE FOR BABY CARRIAGES

Application filed March 2, 1929. Serial No. 344,073.

This invention relates to brakes for children's carriages, and has for an object to provide a simple and effective brake which will automatically set itself when the carriage is not in use doing away with any possibility of the carriage running away and giving maximum safety.

It is another object of the invention to provide a brake mechanism of this character in which all four wheels of the carriage will be set when the brakes are applied.

With the foregoing and other objects in view, the invention consists in certain novel features of construction, combinations and arrangements of parts as will be more fully disclosed in connection with the accompanying drawing. In this drawing, Fig. 1 is a top plan view of the running gear of a child's carriage showing my improved brake mechanism applied thereto and a portion broken away to more clearly show the construction.

Fig. 2 is a top plan view of a portion of the mechanism on a somewhat larger scale with the elements in a different position, some of the elements being shown in section to more clearly illustrate the construction.

Fig. 3 is a detail section of the pawl and catch mechanism, substantially on line 3—3 of Fig. 1.

Fig. 4 is a side elevation of the connection to the crank, the crank being shown in section and the plane of the figure being substantially on line 4—4 of Fig. 2, and Fig. 5 is a detail section substantially on line 5—5 of Fig. 2.

The running gear of the carriage is shown somewhat diagrammatically in Fig. 1 and includes the side frames 10 mounted on the front and rear axles 11 and 12 respectively. The front axle 11 rotates in bearings 13 in the frame and carries the forward wheels 14 which are permanently secured to the axle 11 by any suitable means, such as a key 15, so that rotation of the wheels will rotate the axle. The rear axle 12 may turn with the rear wheels 16 or it may be of the usual type of stationary axle on which the wheels are mounted to turn. The carriage is operated by the usual hand bar 17 connected to rearward upward extensions 18 of the frame members 10.

Mounted on these frame members 10 are guide members 19 secured to the frame members by any suitable means, such as rivets 20, and the guide members have forked end members 21 extending over the flat portion 22 of the brake bar 23 so as to hold this bar on the side members but permit the bar to have sliding movement thereon. The brake bar may be of different constructions but is preferably a flat strip of resilient somewhat flexible metal. The flat portions 22 are formed by twisting a portion of this bar to a position at right angles to the remainder of the bar as indicated, so that the major portion of the bar stands upright and the free end portions 24 are to the rear of the rear wheels 16. Mounted on the bars 10 rearwardly of the bar 23 are guide brackets 25 secured to the bars by any suitable means, such as rivets 26. These brackets act as guides for rods 27 which are secured to the flat portions 22 of the brake bar by pivots 28, and a spring 29 embraces each rod and reacts at one end against the bracket 25 and at the other end against a collar 30 secured on the rod, and therefore, these springs tend to slide the brake bar 23 rearwardly away from the wheels 16 to release the brakes and normally hold the flat portions 22 of the bar against the front ends of the guides 25.

The front axle 11 is provided with a crank 31 to which is secured a rod 32 by any suitable means, such as the clamp 33. The rear end of this rod 32 is provided with a series of notches 34 in its top side adjacent its rear end, and this rod extends through and is guided for sliding movements in an opening 35 in the front wall of a housing 36 mounted on the brake bar 23 substantially at its mid length. Pivoted to the top of this housing is a pawl 37 which has a downwardly depending nose 38 passing through an opening in the top wall of the housing and adapted to seat in any one of the notches 34 in the bar 32. The front portion of this pawl may be enlarged, as shown at 39, so as to weight this front end to increase its tendency to drop, and this action may be further insured by means of a light spring 40 if desired. A flexible wire, rod, cable or chain 41 is secured to this pawl and passes through a suitable guide, such as a tube 42, to a position adjacent the handle bar 17. Mounted on this bar are one or more levers 43 pivoted to the bar at 44 and to the rod 41 at 45, and it is preferred that the bar 17 be recessed, as indicated at 46 so that these levers 43 may fold into it.

The operation is as follows: When the carriage is in use the operator grips the bar 17 with one or both hands and by depressing one or both of the levers 43 he withdraws the nose of the pawl 37 from the notches 34 in the rod 32. The springs 29 then draw the brake bar 23 away from the wheels 16, the rearward movement of the bar being limited by engagement of the flat portions 22 with the front ends of the guide brackets 25. The carriage can now be operated in the usual manner, the crank 31 as it rotates merely sliding the bar 32 in the guide opening in the front wall of the housing 36. Now should the operator wish to leave the carriage standing no conscious operation is required to set the brakes, because as soon as the levers 43 are released the pawl 37 drops and its nose 38 seats in one of the notches 34 in the rod 32. Now if the carriage moves rotation of the front wheels 14 will turn the crank 31 and tend to slide the bar 32 either forwardly or backwardly depending on in which position the crank 31 happens to be. If the crank 31 is forward of the axle, as shown in Fig. 1, then the rotation of the wheels will tend to shift the rod 32 rearwardly. The connection of the rod to the pawl, therefore, pushes backwardly the central portion of the brake bar 23, as indicated in dotted lines, Fig. 1, as this bar is somewhat flexible. As the rear edges of the flats 22 are at this time in engagement with the forward ends of the guide brackets 25 these brackets act as pivots and the free end portions 24 of the brake bar are, therefore, swung forwardly into engagement with the tires of the wheels. The rear wheels are, therefore, braked and the front wheels are locked against rotation by the crank and the rod 32. If the crank 31 instead of being forwardly of the axle when the levers 43 are released is to the rear thereof, as shown in Fig. 2, then rotation of the wheels will tend to shift the rod 32 forwardly. Then as the pawl drops into one of the notches 34 the action of the crank and the rod 32 draws the brake bar 23 bodily forward away from the brackets 25 against the action of the springs 29, as indicated in Fig. 2, and presses the free portions 24 of the brake bar against the tires of the rear wheels. Thus in this position the rear wheels are braked and the front wheels are locked against rotation because of the crank 31 and the bar 32. Thus with this construction as soon as the operator's hands are removed from the handle bar 17 all the brakes are automatically set immediately by any movement of the carriage, and all four wheels are held against rotation giving maximum braking effect. There is, therefore, no danger of a nurse leaving the carriage without setting the brakes and there is thus no danger of the carriage running off the sidewalk or down a hill. Still further in using the carriage all that is necessary to release the brakes is to compress one of the handle levers 43 when gripping the handle bar 17, which is a natural operation.

Having thus set forth the nature of my invention, what I claim is:

1. In a brake mechanism for children's carriages, a front axle having a crank, wheels rigid on said axle, movable brakes adapted to engage the rear wheels, a releasable operating connection from the crank to said brakes for applying the brakes, and means accessible to the operator for disconnecting said connection when operating the carriage.

2. In a brake mechanism for children's carriages, a front axle having a crank, wheels rigid on said axle, movable brakes adapted to engage the rear wheels, an operative connection from the crank to the brakes including two relatively sliding members one of which has a series of notches, a pawl carried by the other member adapted to engage said notches to connect the members and tending to move to engage said notches, and manual means accessible to the operator to withdraw the pawl from the notches while operating the carriage.

3. In a brake mechanism for children's carriages, a front axle having a crank, wheels rigid on said axle, brakes adapted to engage the rear wheels including a flexible bar, a pair of spaced guides for the bar arranged to limit movement thereof in one direction, stops to limit movement of the bar in the opposite direction, springs tending to move the bar toward the stops, a releasable operating connection from the crank to the bar between said stops and adapted to shift the bar in both directions to apply the brakes by forcing the bar bodily against the rear wheels or to flex the bar between the stops and cause it to engage the wheels, and manual means accessible to the operator to release said connection to prevent operation of the brakes while operating the carriage.

4. In a brake mechanism for children's carriages, a front axle having a crank, wheels rigid on said axle, brakes adapted to engage the rear wheels including a flexible bar, a pair of spaced stops on one side of the bar, springs tending to hold the bar against said stop and away from engagement with the wheels, an operative connection from the crank to said bar between the stops, manual means operable by the operator to render said connection ineffective to apply the brakes while operating the carriage, and means to automatically render said connection operative to apply the brakes when said manual means is released.

5. In a brake mechanism for children's carriages, brakes to engage wheels of the carriage, means operated by rotation of one or more of the carriage wheels to apply the brakes, manual means accessible to the operator for rendering said means inoperative to apply the brakes to permit free operation of the carriage, and means to automatically render said means operative to apply the brakes by movement of the carriage when said manual means is released.

6. In a brake mechanism for children's carriages, an axle having a crank, wheels connected to rotate said axle, brakes to engage wheels of the carriage, an operative connection from the crank to the brakes to apply the brakes by rotation of the crank including a guide member and a rod slidable relative to said guide member having a series of notches, a pawl on the guide member tending to engage said notches to prevent relative movement between the rod and guide, and a manual means accessible to the operator to remove said pawl from the notches to permit free operation of the carriage.

7. In a brake mechanism for children's carriages, an axle having a crank, wheels connected to rotate said axle, brakes to engage wheels of the carriage, a releasable operating connection from the crank to said brakes for applying the brakes, and means accessible to the operator for disconnecting said connection when operating the carriage.

In testimony whereof I affix my signature.

JULIUS G. PARARRA.